Figure 1:
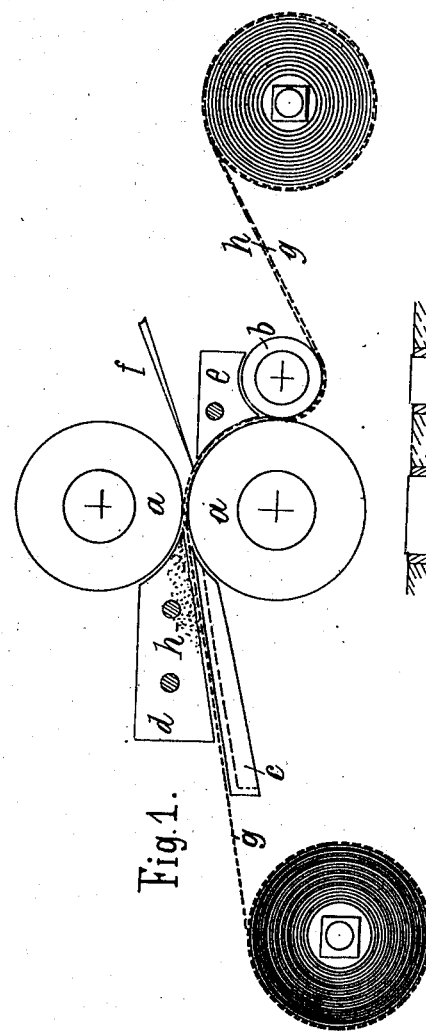

R. HOLTKOTT.
PROCESS AND APPARATUS FOR MANUFACTURING LINCRUSTA.
APPLICATION FILED APR. 8, 1910.

1,004,027.  Patented Sept. 26, 1911.

UNITED STATES PATENT OFFICE.

RICHARD HOLTKOTT, OF BEDBURG, GERMANY.

PROCESS AND APPARATUS FOR MANUFACTURING LINCRUSTA.

1,004,027. Specification of Letters Patent. Patented Sept. 26, 1911.

Application filed April 8, 1910. Serial No. 554,581.

*To all whom it may concern:*

Be it known that I, RICHARD HOLTKOTT, a subject of the German Emperor, and residing at Bedburg, Rhine Province, German Empire, have invented certain new and useful Improvements in Processes and Apparatus for Manufacturing Lincrusta, of which the following is a specification.

Hitherto lincrusta has only been manufactured of a uniform color over the entire surface.

The present invention contemplates the manufacture of lincrusta having a variegated, striped pattern. For this purpose the lincrusta composition is fed to the pressing or calender rollers in the form of differently colored masses. These latter may be separated from each other by means of partitions, located upon the feed table and having tapering ends reaching into the "mouth" or groove between the pair of rollers.

In feeding lincrusta composition to the calender rolls more material must be supplied than is actually necessary for embossing the goods with the desired relief-designs. The reason of this is that the sunken parts (intaglios) of the embossing rollers are of different depths, and because the deep intaglios must always have an ample supply of material fed to them during their rotation, in order that the recesses may be well filled. The surplus composition, rejected by the embossing roller, is pushed back between the latter and the calender rolls; it is then seized again by the embossing roller and worked up, when the deeper intaglios require an extra supply of material to fill them.

To prevent the composition between the embossing and the calendar rollers from mingling at the places where the differently colored masses contact, whereby the sharply defined line of demarcation between the various colors would be obliterated, partitions may with advantage also be provided between the embossing and the calender rollers. These partitions should be shaped to fit to the periphery of the rollers in order to effectively keep the diversely colored masses of composition from becoming mixed.

The variously colored masses can be the more easily kept apart if, at the places where the different colors meet, the above-mentioned surplus composition is removed before it passes the embossing roller. This may be done by means of a suitable device which scrapes away narrow strips of the composition as the latter leaves the calender rolls, pressed flat upon the foundation or backing. In this manner grooves are formed in the evenly spread composition, whereby the differently colored masses are sharply divided. Owing to the pressure exerted by the embossing roller, these grooves are subsequently filled or shut again. The colored masses thus again close up, but nevertheless remain quite distinct. For the excess material has been removed which would otherwise under the action of the embossing roller cause blending of the colors, owing to adjacent masses of different colors being pressed into each other.

My invention is illustrated in the accompanying drawing, in which—

Figure 2:
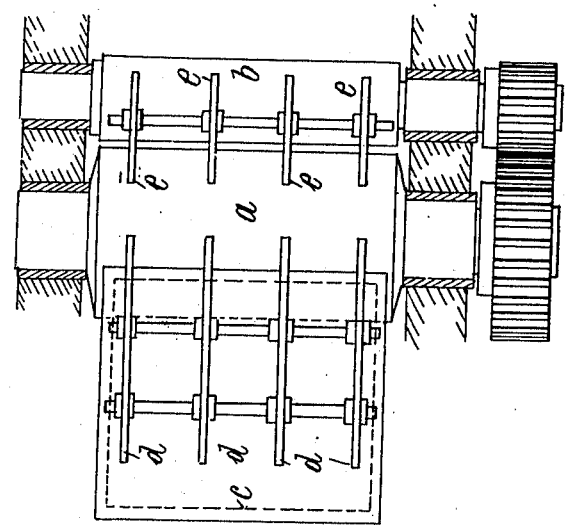

Figure 1 is a sectional elevation, and Fig. 2 a sectional plan of apparatus suitable for carrying out the new process.

*a, a* represent a pair of calender rolls, beside the lower of which there is mounted the embossing roller *b* for impressing the relief-designs. The differently colored masses of lincrusta composition *h*, lying side by side, are fed to the rolls *a, a* over the calender table. *c, d* being partitions for separating the various masses. Between the lower roll *a* and the embossing roller *b* partitions *e* are furnished, to prevent the surplus lincrusta composition from becoming mixed.

*f* are fingers, scrapers, or the like, whose office it is to remove from the paper foundation *g* over the breadth of a few millimeters, in front of the partitions *e*, the lincrusta composition which has been pressed between the calender rolls.

Having thus described my invention, I declare that what I claim as new and desire to secure by Letters Patent is—

1. The herein described process of manufacturing variegated lincrusta, consisting in feeding differently colored masses of lincrusta composition side by side to and through the calendering rollers and embossing rollers, in removing in form of narrow strips a part of the paste pressed on the fabric foundation at the points where the differently colored strips meet one another and in pressing the board, so that the edges of the strips come together.

2. In an apparatus for carrying out the herein described process, the combination with a pair of calendering rollers and an embossing roller, of a base or table, partition like slats arranged on the inlet side to the calendering rollers and extending down to the base, and partitions located between the calendering rollers and the embossing roller, the first named partitions serving to keep apart the differently colored masses of lincrusta composition while the latter is fed into the calendering rollers and the latter partitions serving to separate the masses of different colors after leaving the calendering rollers.

3. In an apparatus for carrying out the herein described process, the combination with a pair of calendering rollers and an embossing roller, of a base or table, partition like slats arranged on the inlet side to the calendering rollers and extending down to the base, partitions located between the calendering rollers and the embossing roller, the first named partitions serving to keep apart the differently colored masses of lincrusta composition while feeding and the latter partitions serving to separate the masses of different colors after leaving the calendering rollers, and scrapers between the calendering rollers and embossing roller arranged at the points where the variously colored strips lying adjacent to each other meet, said scrapers being adapted to remove narrow strips of the lincrusta composition, as the latter leaves the calendering rollers.

In testimony whereof I affix my signature in presence of two witnesses.

RICHARD HOLTKOTT.

Witnesses:
  GERTRUD BONA,
  BESSIE F. DUNLAP.